(12) United States Patent
Fukuda et al.

(10) Patent No.: US 8,557,216 B2
(45) Date of Patent: Oct. 15, 2013

(54) MAGNESIUM ALUMINUM TITANATE CRYSTAL STRUCTURE AND METHOD FOR PRODUCING SAME

(75) Inventors: Tsutomu Fukuda, Kakogawa (JP); Masahiro Fukuda, Uji (JP); Masaaki Fukuda, Kakogawa (JP); Toshinobu Yoko, Uji (JP); Masahide Takahashi, Uji (JP)

(73) Assignee: Ohcera Co., Ltd., Osaka-shi (JP)

( * ) Notice: Subject to any disclaimer, the term of this patent is extended or adjusted under 35 U.S.C. 154(b) by 681 days.

(21) Appl. No.: 11/587,991

(22) PCT Filed: Apr. 28, 2005

(86) PCT No.: PCT/JP2005/008226
§ 371 (c)(1),
(2), (4) Date: Oct. 30, 2006

(87) PCT Pub. No.: WO2005/105704
PCT Pub. Date: Nov. 10, 2005

(65) Prior Publication Data
US 2007/0224110 A1    Sep. 27, 2007

(30) Foreign Application Priority Data
Apr. 28, 2004  (JP) ................................ 2004-134662

(51) Int. Cl.
*C01G 23/00* (2006.01)
*C04B 35/00* (2006.01)

(52) U.S. Cl.
USPC .......................................... 423/598; 501/136

(58) Field of Classification Search
USPC ............................. 423/598; 501/118, 134–136
See application file for complete search history.

(56) References Cited

U.S. PATENT DOCUMENTS

| 7,148,168 | B2 * | 12/2006 | Fukuda et al. | 501/134 |
| 7,166,552 | B2 * | 1/2007 | Fukuda et al. | 501/136 |
| 2003/0015829 | A1 * | 1/2003 | Fukuda et al. | 264/674 |

FOREIGN PATENT DOCUMENTS

| EP | 1 559 696 A1 | 8/2005 |
| EP | 1 645 319 A1 | 4/2006 |
| EP | 1 652 830 A1 | 5/2006 |
| JP | 2002-145659 | 5/2002 |
| WO | WO 03/091183 A1 | 11/2003 |

OTHER PUBLICATIONS

Takahashi et al. "Preparation, Structure, and Properties of Thermally and Mechanically Improved Aluminum Titanate Ceramics Doped with Alkali Feldspar," Journal of the American Chemical Society, 85, (12), 3025-30 (2002).*

"JIS R 1601: Testing method for flexural strength (modulus of rupture) of fine ceramics at room temperature" Japanese Standards Association, 2008, Reference No. JIS R 1601 : 2008 (E).*

Giordano, L. et al., "Microstructure and thermal expansion of Al2TiO5-MgTi2O5 solid solutions obtained by reaction sintering", Journal of the European Ceramic Society, vol. 22, No. 11, pp. 1811-1822, 2002.

Buscaglia, V. et al., "Decomposition of Al2TiO5-MgTi2O5 solid solutions: a thermodynamic approach", Journal of Materials Science, vol. 31, No. 19, pp. 5009-5016, 1996.

Daimon, Keiji, "Preparation and Thermal Expansion Characteristics of Sintered Bodies of Al2TiO5-MgTi2O5 Solid Solution with Preferred Orientation", The Ceramic Society of Japan, vol. 98, No. 4, pp. 365-369, 1990. (with English abstract).

Buscaglia, Vincenzo et al., "Decomposition of Al2TiO5 and Al2(1–x)MgxTi(1+=)O5 Ceramics", Journal of the American Ceramic Society, vol. 81, No. 10, pp. 2645-2653, 1998.

* cited by examiner

*Primary Examiner* — Anthony J Zimmer
(74) *Attorney, Agent, or Firm* — Oblon, Spivak, McClelland, Maier & Neustadt, L.L.P.

(57) ABSTRACT

To provide an aluminum magnesium titanate crystal structure which can be used stably in variable high temperatures, because of its excellent heat resistance, thermal shock resistance, high thermal decomposition resistance and high mechanical property, and a process for its production. An aluminum magnesium titanate crystal structure, which is a solid solution wherein at least some of Al atoms in the surface layer of aluminum magnesium titanate crystal represented by the empirical formula $Mg_xAl_{2(1-x)}Ti_{(1+x)}O_5$ (wherein $0.1 \leq x < 1$) are substituted with Si atoms, and which has a thermal expansion coefficient of from $-6 \times 10^{-6}(1/K)$ to $6 \times 10^{-6}(1/K)$ in a range of from 50 to 800° C. at a temperature raising rate of 20° C./min, and a remaining ratio of aluminum magnesium titanate of at least 50%, when held in an atmosphere of 1,100° C. for 300 hours.

26 Claims, No Drawings

MAGNESIUM ALUMINUM TITANATE CRYSTAL STRUCTURE AND METHOD FOR PRODUCING SAME

TECHNICAL FIELD

The present invention relates to an aluminum magnesium titanate crystal structure, particularly to an aluminum magnesium titanate crystal structure having high mechanical strength, which can be used continuously and stably at high temperatures, while maintaining its high heat resistance, extremely small thermal expansion coefficient and high corrosion resistance, and to a process for its production.

BACKGROUND ART

Aluminum magnesium titanate is a homogeneous solid solution formed over the entire compositional range of aluminum titanate and magnesium titanate. A sintered product of aluminum magnesium titanate has high heat resistance, a small thermal expansion coefficient, and excellent corrosion resistance. The melting point of aluminum magnesium titanate is about 1,640° C. e.g. in the case of a sintered product wherein aluminum titanate and magnesium titanate are solid-solubilized in an approximately equivalent molar ratio. This temperature is lower when compared with the melting point of aluminum titanate of 1,870° C., but it is higher when compared with the melting point of magnesium titanate of 1,600° C. Therefore, in general, the upper limit of heat resistance of aluminum magnesium titanate is inferior to that of aluminum titanate, but it is still superior in comparison with that of magnesium titanate.

On the other hand, an aluminum titanate sintered product and a magnesium titanate sintered product are, respectively, constructed from crystal grains having the pseudobrookite type crystal structure, and their coefficients of thermal expansion are anisotropic. Therefore, when heating and cooling are carried out, slippage by a thermal stress is likely to take place at the crystalline interface, and there is a drawback such that the mechanical strength tends to deteriorate due to progress in micro cracks and apertures. Since aluminum magnesium titanate also has the same drawback, the aluminum magnesium titanate sintered product is also insufficient in mechanical strength. Specifically, in a case where the aluminum magnesium titanate sintered product is used in an application in which high temperatures and heavy loads are applied, it cannot exhibit sufficient durability.

Further, the lower limit of the temperature for synthesizing aluminum titanate is 1,280° C., while the lower limit of the temperature for synthesizing magnesium titanate is 900° C. Both are unstable in the temperature range lower than the temperatures for their syntheses. As a solid solution of these compounds, aluminum magnesium titanate is also unstable at a temperature lower than the temperature range for its synthesis like aluminum titanate and magnesium titanate. Accordingly, if aluminum magnesium titanate is used in a decomposing temperature range for long time, it is likely to undergo thermal decomposition to form $TiO_2$ (rutile) and $MgAl_2O_4$ (spinel). Here, the decomposing temperature range for aluminum magnesium titanate varies depending on a solid solution ratio of aluminum titanate and magnesium titanate, but it is usually from about 800 to 1,280° C. For example, in the case of an aluminum magnesium titanate sintered product, in which aluminum titanate and magnesium titanate are solid-solubilized in an approximately equivalent molar ratio, the aluminum magnesium titanate sintered product thermally decomposes into $TiO_2$ (rutile) and $MgAl_2O_4$ (spinel) (Non-Patent Document 1) if it is continuously used at a temperature in the vicinity of 1,100° C. for long time.

Therefore, a conventional aluminum magnesium titanate sintered product could not be used continuously in such a decomposing temperature range, and regardless of its high heat resistance, extremely small thermal expansion coefficient and excellent corrosion resistance, the use of the conventional aluminum magnesium titanate was limited, because it had low reliability due to problems in the thermal decomposition property and mechanical strength.

Non-Patent Document 1: Journal of American Ceramic Society, 1998, 81 [10], pp. 2645-2653

DISCLOSURE OF THE INVENTION

Object to be Accomplished by the Present Invention

The present invention is made on the basis of the above problems, and its object is to provide an aluminum magnesium titanate crystal structure having high mechanical strength, which has a low thermal decomposition property and can be used continuously and stably at high temperatures, while maintaining its high heat resistance, extremely small thermal expansion coefficient and high corrosion resistance, and a process for its production.

Means to Accomplish the Object

In order to solve the above problems, the present inventors have conducted extensive studies and found that an aluminum magnesium titanate crystal structure which is a solid solution wherein some Al atoms in the surface layer of aluminum magnesium titanate crystal are substituted with Si atoms, can accomplish the above object by doping a silicon-containing compound having a melting point in a specific temperature range, preferably by doping an aluminosilicate compound, to an aluminum magnesium titanate solid solution crystal represented by the empirical formula $Mg_xAl_{2(1-x)}Ti_{(1+x)}O_5$ (wherein $0.1 \leq x < 1$), and have accomplished the present invention on the basis of this finding.

Accordingly, the present invention provides the following aluminum magnesium titanate crystal structure and process for its production.

(1) An aluminum magnesium titanate crystal structure, which is a solid solution wherein at least some of Al atoms in the surface layer of aluminum magnesium titanate crystal represented by the empirical formula $Mg_xAl_{2(1-x)}Ti_{(1+x)}O_5$ (wherein $0.1 \leq x < 1$) are substituted with Si atoms, and which has a thermal expansion coefficient of from $-6 \times 10^{-6}$ (1/K) to $6 \times 10^{-6}$ (1/K) in a range of from 50 to 800° C. at a temperature raising rate of 20° C./min, and a remaining ratio of aluminum magnesium titanate of at least 50%, when held in an atmosphere of 1,100° C. for 300 hours.

(2) The aluminum magnesium titanate crystal structure as defined in (1), which is a solid solution wherein 0.1 to 1 mol % of Al atoms are substituted with Si atoms.

(3) The aluminum magnesium titanate crystal structure according to (1) or (2), which has a three-point bending strength of at least 25 MPa in accordance with JIS R1601.

(4) A process for producing the aluminum magnesium titanate crystal structure as defined in (1), which comprises firing at a temperature of from 1,200 to 1,700° C., a raw material mixture having 1 to 10 parts by mass of a silicon-containing compound having a melting point of from 700 to 1,500° C., mixed to 100 parts by mass of a mixture comprising a Mg-containing compound, Al-containing compound and Ti-containing compound in the same ratio as the metal component ratio of Mg, Al and Ti in aluminum magnesium titanate represented by the empirical formula $Mg_xAl_{2(1-x)}Ti_{(1+x)}O_5$ (wherein 0.1≤x<1), as calculated as the respective oxides.

(5) The process according to (4), wherein aluminum magnesium titanate crystal is formed in a liquid phase of the silicon-containing compound.

(6) The process according to (4) or (5), wherein molding assistants are added to the raw material mixture, followed by firing a molded product.

(7) The process according to any one of (4) to (6), wherein the raw material mixture is subjected to prefiring within a temperature range of from 700 to 1,000° C., followed by firing.

(8) The process according to any one of (4) to (7), wherein the silicon-containing compound is an aluminosilicate.

(9) The process according to (8), wherein the aluminosilicate is a mineral selected from plagioclase, feldspathoid, mica clay mineral, zeolite and cordierite.

Effect of the Invention

As mentioned above, according to the present invention, a novel aluminum magnesium titanate crystal structure having high thermal decomposition resistance and high mechanical strength is provided, while maintaining its inherent high heat resistance, extremely small thermal expansion coefficient and excellent thermal shock resistance. The reason as to why an aluminum magnesium titanate crystal structure having such excellent properties is obtainable in accordance with the present invention is not clearly understood, but may probably be as follows.

In the present invention, in a case where the above-mentioned silicon-containing compound having a specific melting point is doped with the mixture that forms aluminum magnesium titanate, the silicon-containing compound in a state of liquid phase melts at a temperature of from 700 to 1,500° C., and the formation of aluminum magnesium titanate i.e. the reaction of aluminum magnesium titanate formation takes place in a liquid phase, whereby dense crystals will be formed thereby improving its mechanical strength. Further, the Si component contained in the silicon-containing compound, is substituted for some Al atoms in the crystal lattice of aluminum magnesium titanate for solid-solubilization. However, it will be solid-solubilized preferentially in the aluminum titanate crystal system rather than in the magnesium titanate crystal system. The reason for this is such that the strain of the octahedron constituting the crystal structure of aluminum titanate is large among pseudobrookite crystal structures, and the crystallographic anisotropy is remarkable, whereby the crystal structure is unstable as compared with magnesium titanate.

Namely, Si is solid-solubilized preferentially in the crystal lattice of aluminum titanate and mainly occupies Al sites. At that time, rather than occupying alone the Al sites where a fundamentally trivalent electrical charge balance is maintained, tetravalent Si will form a pair with bivalent Mg in the system so that the pair of Si and Mg will be sexivalent in total and will be substituted for adjacent two Al (sexivalent in total). Thus, it is considered that by the simultaneous presence of Si and Mg, diffusion of ions among the respective cations can be suppressed even at high temperatures, and a stable crystal structure can be secured, whereby further improved thermal decomposition resistance can be obtained.

BEST MODE FOR CARRYING OUT THE INVENTION

The aluminum magnesium titanate crystal structure of the present invention is a solid solution wherein at least some Al atoms in the surface layer of aluminum magnesium titanate crystal represented by the empirical formula $Mg_xAl_{2(1-x)}Ti_{(1+x)}O_5$ are substituted with Si atoms. In the present invention, at least Al atoms present in the surface layer of aluminum magnesium titanate crystal may be substituted with Si atoms, and of course, Al atoms in the interior (deep layer) of aluminum magnesium titanate may also be substituted with Si atoms. The substitution with Si atoms is preferably as much as possible within the range of the solid solubility limit. Further, the value x is 0.1≤x<1, and particularly preferably 0.25≤x≤0.75. Furthermore, aluminum magnesium titanate crystal is preferably a solid solution in which 0.1 to 1 mol %, particularly preferably 0.2 to 0.7 mol %, most preferably 0.25 to 0.45 mol % of Al atoms, are substituted with Si atoms. In a case where this substitution ratio is less than 0.1 mol %, stabilization of crystals by solid-solubilization of Si atoms will be insufficient, whereby high thermal decomposition resistance will not be obtained. On the other hand, in a case where this substitution ratio is more than 1 mol %, it exceeds the solid solubility limit to a crystal of Si atoms, whereby precipitation of an impurity phase will be triggered, and such a substitution ratio does not contribute to suppression of thermal decomposition and causes an increase in the thermal expansion coefficient.

The crystal structure of the present invention, which is a solid solution substituted with Si atoms, has an extremely small thermal expansion coefficient of from $-6\times10^{-6}$ (1/K) to $6\times10^{-6}$ (1/K) and further from $-3\times10^{-6}$ (1/K) to $3\times10^{-6}$ (1/K), when heated in a range of from 50 to 800° C. at a temperature raising rate of 20° C./min. As a result, the heat shock resistance of the crystal structure is extremely high and excellent.

Further, a characteristic of the aluminum magnesium titanate crystal structure of the present invention resides in high thermal decomposition resistance such that the aluminum magnesium titanate crystal structure can be used continuously and stably at high temperatures. Such a thermal decomposition resistance is higher when the remaining ratio of aluminum magnesium titanate held in a high temperature atmosphere of 1,100° C. for 300 hours is at least 50%, higher when the remaining ratio is at least 75%, and highest when the remaining ratio is at least 90%. This is in contrast with Comparative Example given hereinafter, wherein a conventional aluminum magnesium titanate shows a remaining ratio of aluminum magnesium titanate as low as about 35%. Accordingly, the aluminum magnesium titanate crystal structure of the present invention can provide a reliable material, which can be used with stability for a long period of time at high temperatures including a decomposing temperature range of from 800 to 1,280° C. as described above.

Furthermore, a characteristic of the aluminum magnesium titanate crystal structure of the present invention resides in its mechanical strength. That is, on the basis of the measurement of a three-point bending strength in accordance with JIS R1601, the aluminum magnesium titanate crystal structure has a three-point bending strength of at least 25 MPa, preferably at least 30 MPa and most preferably at least 40 MPa. This is in contrast with Comparative Example given hereinafter, wherein a conventional aluminum magnesium titanate crystal structure has a three-point bending strength as low as about 10 MPa. Accordingly, the aluminum magnesium titanate crystal structure of the present invention can provide a material which is useful in a field where a high mechanical strength is required and the conventional aluminum magnesium titanate cannot be used.

The aluminum magnesium titanate crystal structure of the present invention is produced by firing at a temperature of from 1,200 to 1,700° C. a raw material mixture having 1 to 10 parts by mass of a silicon-containing compound having a melting point of from 700 to 1,500° C., mixed to 100 parts by mass of a mixture comprising a Mg-containing compound, Al-containing compound and Ti-containing compound in the same ratio as the metal component ratio of Mg, Al and Ti in aluminum magnesium titanate represented by the empirical formula $Mg_xAl_{2(1-x)}Ti_{(1+x)}O_5$ (wherein 0.1≤x<1), as calculated as the respective oxides.

The above Mg-containing compound, Al-containing compound and Ti-containing compound to be used, are not particularly limited so long as they are components capable of synthesizing aluminum magnesium titanate by firing. The Mg-containing compound, Al-containing compound and Ti-containing compound may not necessarily be separate compounds respectively, and may be a compound containing two or more metal components. Such compounds may usually be suitably selected among those to be used as starting materials for various ceramics, such as alumina ceramics, titania ceramics, magnesia ceramics, aluminum titanate ceramics, magnesium titanate ceramics, spinel ceramics and aluminum magnesium titanate ceramics. Specific examples of such compounds include oxides such as $Al_2O_3$, $TiO_2$ and MgO, composite oxides containing at least two types of metal components, such as $MgAl_2O_4$, $Al_2TiO_5$, and various spinel structures containing Mg and Ti, compounds containing one or more metal components selected from the group consisting of Al, Ti and Mg (such as carbonates, nitrates or sulfates).

The blend ratio of the Mg-containing compound, Al-containing compound and Ti-containing compound is such that the ratio of the metal components contained in these compounds would be a ratio similar to, preferably substantially the same ratio as, the metal component ratio of Mg, Al and Ti in aluminum magnesium titanate represented by the above empirical formula $Mg_xAl_{2(1-x)}Ti_{(1+x)}O_5$. By using the above respective compounds as mixed in such a ratio, it is possible to obtain aluminum magnesium titanate having the same metal component ratio as the metal component ratio in the mixture used as the starting material.

When the aluminum magnesium titanate crystal structure of the present invention is to be formed, a silicon-containing compound having a melting point of from 700 to 1,500° C. is mixed to the mixture comprising the Mg-containing compound, Al-containing compound and Ti-containing compound. In such a case, the melting point of the silicon-containing compound to be used is important. If the melting point is less than 700° C., the additive will melt before the presintering, whereby no crystal structure having a sufficient strength will be formed in the molded product. Whereas, if the melting point is higher than 1,500° C., melting of the additive takes place after the reaction for forming aluminum magnesium titanate, the reaction for forming aluminum magnesium titanate cannot be carried out in a liquid phase, whereby solid-solubilization of Si atoms becomes difficult, and therefore, the object of the present invention cannot be accomplished. For example, in a case where $SiO_2$ having the melting point of 1,723° C. was employed, no Si atom was confirmed in the interior of the crystal structure to be obtained, and it was rather separately deposited in the vicinity of crystal grains in the form of $SiO_2$. The melting point of the silicon-containing compound is preferably from 900 to 1,300° C. and particularly preferably from 1,000 to 1,200° C.

As the above silicon-containing compound, an aluminosilicate is preferred. As the aluminosilicate, a natural mineral or a synthesized compound may be employed, but an aluminosilicate mineral is particularly preferred in view of its availability and cost. The aluminosilicate mineral may, for example, be plagioclase, feldspathoid, alkali feldspar, mica clay mineral, zeolite or cordierite. Among them, alkali feldspar, plagioclase or feldspathoid is particularly effective for enhanced sintering of aluminum magnesium titanate because of its low melting point.

The amount of the silicon-containing compound to be used, is preferably from 1 to 10 parts by mass, more preferably from 3 to 5 parts by mass, per 100 parts by mass of the total amount, as calculated as oxides, of the Mg-containing compound, Al-containing compound and Ti-containing compound, even though it depends on the ratio of Al atoms in aluminum magnesium titanate crystal to be substituted with Si atoms. In such a case, the total amount of the mixture as calculated as oxides, is the weight after carrying out heat treatment to remove moisture or organic substances contained in the above mixture, or when presintering is carried out, the weight before the main firing after the presintering.

In the present invention, to the raw material mixture comprising the Mg-containing compound, Al-containing compound, Ti-containing compound and silicon-containing compound, other additives may be added, as the case requires, whereby the nature of the crystal structure thereby obtainable, can be improved. As such other additives, oxides such as $SiO_2$, $ZrO_2$, $Fe_2O_3$, MgO, $Al_2O_3$, $TiO_2$, CaO and $Y_2O_3$, or oxides having a spinel structure containing Mg, may, for example, be mentioned. At least one of these additives may be added preferably in an amount of at most 15 parts by mass, per 100 parts by mass of the above mixture.

The raw material mixture comprising the Mg-containing compound, Al-containing compound, Ti-containing compound and silicon-containing compound is thoroughly mixed and pulverized. The mixing and pulverization of the raw material mixture are not particularly limited and can be carried out by known methods. For example, they may be carried out by means of a ball mill, a medium-stirring mill, etc. The pulverization degree of the above raw material mixture is not particularly limited, but the average particle size is preferably at most 30 μm, particularly preferably from 8 to 15 μm. The smaller the average particle size, the better, so long as it is within a range where no secondary particles will be formed.

The above mixture can be fired as it is, but preferably the mixture is preliminarily molded into a final form to be used and then fired. At the time of molding, molding assistants may preferably be incorporated to the above mixture. As such molding assistants, known agents such as a binder, a release agent, a defoaming agent and a peptizer may be employed. As the binder, polyvinyl alcohol, microwax emulsion, methylcellulose or carboxymethylcellulose may, for example, be preferred. As the release agent, a stearic acid emulsion may, for example, be preferred; as the defoaming agent, n-octyl alcohol or octylphenoxyethanol may, for example, be preferred; and as the peptizer, diethylamine or triethylamine may, for example, be preferred.

The amounts of the molding assistants are not particularly limited. However, in the case of the present invention, they are preferably within the following ranges, respectively, as calculated as solid contents, per 100 parts by mass of the total content, as calculated as the respective oxides, of the Mg-containing compound, Al-containing compound and Ti-containing compound to be used as the starting materials. Namely, it is preferred to use the binder in an amount of from about 0.2 to 0.6 part by mass, the release agent in an amount of from about 0.2 to 0.7 part by mass, the defoaming agent in an amount of from about 0.5 to 1.5 parts by mass, and the peptizer in an amount of from about 0.5 to 1.5 parts by mass. The raw material mixture having such molding assistants incorporated, is mixed, kneaded and molded. As a method for molding, press molding, sheet molding, cast molding, extrusion molding, injection molding or CIP molding may, for example, be employed.

The molded product obtained is preferably dried and then fired at from 1,200 to 1,700° C., preferably from 1,300 to 1,500° C. The firing atmosphere is not particularly limited and is preferably an oxygen-containing atmosphere such as air which is commonly employed. The firing time is not particularly limited so long as the firing can be done until the sintering proceeds sufficiently, and it is usually at a level of from 1 to 20 hours.

Also with respect to the temperature raising rate or the temperature lowering rate at the time of the above firing, there is no particular restriction, and such conditions may be suitably set so that no cracks will be formed in the obtainable sintered product. For example, it is preferred to gradually raise the temperature without rapid rise of the temperature to sufficiently remove moisture and the molding assistants such as a binder, etc. contained in the above mixture. Further, if necessary, prior to heating at the above-mentioned firing temperature, presintering may be carried out preferably within a temperature range of from 700 to 1,000° C. for from 10 to 30 hours under mild temperature rise, whereby the stress in the sintered product which causes cracking during the formation of aluminum magnesium titanate, can be relaxed, and formation of cracks in the sintered product can be suppressed to obtain a uniform sintered product.

The sintered product thus obtainable has excellent heat resistance and a low thermal expansion coefficient and yet has a crystal structure stabilized, and will thus be a crystal structure having excellent thermal decomposition resistance and high mechanical strength.

EXAMPLES

Now, the present invention will be described in further detail with reference to Examples. However, it should be understood that the present invention is by no means thereby restricted.

Examples 1 to 5

To 100 parts by mass of a mixture comprising 26.7 mass % (20 mol %) of easily sinterable α-alumina, 62.8 mass % (60 mol %) of anatase-type titanium oxide and 10.5 mass % (20 mol %) of periclase-type magnesium oxide present as a natural mineral, from 1 to 10 parts by mass of an alkali feldspar represented by the chemical formula $(Na_{0.6}K_{0.4})AlSi_3O_8$ was added so as to have a solid solution ratio (substitution ratio) of Si atoms indicated in Table 1, and then 0.25 part by mass of polyvinyl alcohol as a binder, 1 part by mass of diethylamine as a peptizer, and 0.5 part by mass of polypropylene glycol as a defoaming agent, were further added and mixed for 3 hours in a ball mill and then dried in a dryer at 120° C. for at least 12 hours to obtain a raw material powder.

The obtained raw material powder was pulverized to about 150 mesh and subjected to pressing under the molding pressure of 60 MPa to obtain a 100 mm×100 mm×10 mm molded product.

The molded product thus obtained was further subjected to firing in accordance with the following heating pattern, followed by letting it stand to cool, to obtain an aluminum magnesium titanate sintered product.
(Heating Pattern)
From room temperature to 140° C. for 21 hours
Maintained at 140° C. for 14 hours
From 140° C. to 216° C. for 21 hours
From 216° C. to 295° C. for 16 hours
From 295° C. to 379° C. for 46 hours
From 379° C. to 458° C. for 20 hours
From 458° C. to 700° C. for 28 hours
Maintained at 700° C. for 3 hours
From 700° C. to 1,000° C. for 26 hours
From 1,000° C. to 1,400° C. for 3 hours
Maintained at 1,400° C. for 4 hours Comparative Example 1

An aluminum magnesium titanate sintered product was obtained in the same manner as in Examples 1 to 5 except that the alkali feldspar was not added.

The sintered products obtained in Examples 1 to 5 as the crystal structures were polished to prepare test specimens. Such specimens were subjected to observation under TEM (Transmission Electron Microscope) and to EDX elemental analysis, whereby the presence of solid-solubilized Si ions inside the crystal grains of Examples 1 to 5 were confirmed. Then, the crystal structures of Examples 1 to 5 were further subjected to the 29Si spectrum analysis by means of NMR (Nuclear Magnetic Resonance), and as a result, Si atoms were found to be present in the crystal structures as having a coordination number of 6. This indicates that from the silicon-containing compound, in which Si atoms have a coordination number of 4, Al atoms (coordination number of 6) are substituted by the reaction in the liquid phase i.e. by solid-solubilization.

Further, diffraction peaks of aluminum magnesium titanate crystal were examined from the results obtained by means of the XRD measurement of the sintered products of Examples 1 to 5 and the crystal structure of Comparative Example 1. The diffraction peaks derived from Examples 1 to 5 were shifted to low-angle side as compared with Comparative Example 1, and each shift was calculated so as to obtain the solid-solubility ratio (substitution ratio) of Si atoms in the crystal.

Further, in accordance with JIS R1618, a test specimen of 5 mm×5 mm×20 mm was cut out from each of the sintered products of Examples 1 to 5 and Comparative Example 1 and subjected to surface polishing, and then the thermal expansion coefficient was calculated on the basis of the expansion in a lengthwise direction when heated in a range of from 50° C. to 800° C. at a temperature raising rate of 20° C./min. The results are shown in Table 1.

Furthermore, a test specimen of 10 mm×10 mm×10 mm was cut out from each of the sintered products of Examples 1 to 5 and the crystal structure of Comparative Example 1 and held in the atmosphere of 1,100° C., and then the remaining ratio α (%) of aluminum magnesium titanate upon expiration of 300 hours was calculated. The results are shown in Table 1.

The remaining ratio of the aluminum magnesium titanate was obtained by means of the XRD measurement in accordance with the following method.

Firstly, when aluminum magnesium titanate undergoes thermal decomposition, $TiO_2$ (rutile) and $MgAl_2O_4$ (spinel) will be formed. Accordingly, by using the integrated intensity ($I_{TiO2(110)}$) of the diffraction peak at the (110) face of rutile and the integrated intensity ($I_{MAT(023)}$) of the diffraction peak at the (023) face of aluminum magnesium titanate, the intensity ratio R of aluminum magnesium titanate to rutile was obtained by the following formula:

$$R=I_{MAT(023)}/(I_{MAT(023)}+I_{TiO2(110)})$$

Further, also with respect to the sintered product before carrying out the thermal treatment at 1,100° C., the intensity ratio $R_0$ of aluminum magnesium titanate to rutile was obtained in the same manner.

Then, using R and $R_0$ obtained as described above, the remaining ratio α (%) of aluminum magnesium titanate was obtained by the following formula:

$$\alpha = (R/R_0) \times 100$$

Then, a test specimen of 3 mm×4 mm×40 mm was cut out from each of the sintered products of Examples 1 to 5 and Comparative Example 1 and subjected to surface polishing and edge grinding (removal of sharp edges). The three-point bending strengths of such test specimens were measured in accordance with JIS R1601. The results are shown in Table 1.

TABLE 1

| | Ratio of solid-solubilized Si atoms in crystal (mol %) | Thermal expansion coefficient ×10⁻⁰⁶ (1/K) | Specific gravity | Remaining ratio α (%) | Three-point bending strength (±standard deviation) MPa |
|---|---|---|---|---|---|
| Ex. 1 | 0.1 | 0.8 | 3.27 | 90.9 | 32.8 (±0.6) |
| Ex. 2 | 0.3 | 1.1 | 3.35 | 100 | 48.2 (±1.7) |
| Ex. 3 | 0.4 | 1.2 | 3.35 | 95.4 | 46.4 (±1.9) |
| Ex. 4 | 0.6 | 1.7 | 3.41 | 97.8 | 49.8 (±1.2) |
| Ex. 5 | 1.0 | 1.9 | 3.46 | 96.7 | 51.0 (±1.6) |
| Comp. Ex. 1 | 0 | 0.9 | 3.23 | 34.8 | 9.6 (±0.6) |

As is evident from Table 1, the solid solution wherein some Al atoms in aluminum magnesium titanate crystal are substituted with Si atoms, has a high remaining ratio of aluminum magnesium titanate crystal as compared with Comparative Example 1, while maintaining its low thermal expansion property. Further, the crystal structures in Examples 1 to 5 have excellent mechanical properties in comparison with Comparative Example 1.

Examples 6 to 10

To 100 parts by mass of a mixture comprising 26.7 mass % (20 mol %) of easily sinterable α-alumina, 62.8 mass % (60 mol %) of anatase-type titanium oxide and 10.5 mass % (20 mol %) of periclase-type magnesium oxide present as a natural mineral, an aluminosilicate mineral having a melting point and a chemical formula shown in Table 2 was added so that it would be 1 part by mass as calculated as $SiO_2$.

Other than the above conditions, aluminum magnesium titanate sintered products were obtained in the same manner as in Examples 1 to 5. A test specimen was cut out from each of the obtained sintered products in the same manner as in Examples 1 to 5, and the thermal expansion coefficient, remaining ratio α (%) of aluminum magnesium titanate and three-point bending strength were measured. The results are shown in Table 3.

TABLE 2

| | Additive | Chemical formula | Melting point |
|---|---|---|---|
| Ex. 6 | Plagioclase | $(Na_{0.8}Ca_{0.6})Al_2Si_2O_8$ | 1,100° C. |
| Ex. 7 | Feldspathoid | $(K_{0.6}Ba_{0.2})AlSiO_4$ | 1,170° C. |
| Ex. 8 | Mica clay mineral | $K_{3/4}Al_{7/4}(FeMg)_{1/4}(OH)_2Al_{1/2}Si_{7/2}O_{10}$ | 1,320° C. |
| Ex. 9 | Zeolite | $(Na_{0.2}Ca_{0.6}K_{0.3})AlSiO_4$ | 1,350° C. |
| Ex. 10 | Cordierite | $Mg_2Al_4Si_5O_{18}$ | 1,450° C. |

TABLE 3

| | Ratio of solid-solubilized Si atoms in crystal (mol %) | Thermal expansion coefficient ×10⁻⁰⁶ (1/K) | Specific gravity | Remaining ratio α (%) | Three-point bending strength (±standard deviation) MPa |
|---|---|---|---|---|---|
| Ex. 6 | 0.3 | 0.8 | 3.32 | 84.9 | 50.1 (±0.4) |
| Ex. 7 | 0.3 | 0.9 | 3.35 | 91.3 | 46.6 (±1.1) |
| Ex. 8 | 0.3 | 0.9 | 3.35 | 87.6 | 48.6 (±1.4) |
| Ex. 9 | 0.3 | 1.1 | 3.31 | 82.1 | 39.8 (±0.9) |
| Ex. 10 | 0.3 | 1.0 | 3.30 | 90.3 | 41.4 (±0.7) |
| Comp. Ex. 1 | 0 | 0.9 | 3.23 | 34.8 | 9.6 (±0.6) |

As is evident from Table 3, the aluminum magnesium titanate crystal structures obtained in Examples 6 to 10, which were subjected to liquid-phase sintering by a Si-containing compound that melts at the temperature at which aluminum magnesium titanate crystal is formed, had low thermal expansion properties, high remaining ratio α (%) of aluminum magnesium titanate crystal and high mechanical strength, as compared with Comparative Example 1.

INDUSTRIAL APPLICABILITY

According to the present invention, a novel aluminum magnesium titanate crystal structure having high thermal decomposition resistance and high mechanical strength is provided while maintaining its excellent heat resistance, extremely small thermal expansion coefficient and excellent thermal shock resistance. Such a crystal structure may, for example, be employed suitably in a wide range of fields e.g. a jig for furnace such as a crucible, a setter, a sagger or a refractory lining; a catalyst carrier or a filter for cleaning exhaust gas from e.g. a diesel engine or a gasoline engine; parts for a power generator; and an electronic component such as a substrate or a capacitor.

The invention claimed is:
1. An aluminum magnesium titanate crystal structure, which comprises a solid solution of aluminum magnesium titanate crystal represented by the empirical formula $Mg_xAl_{2(1-x)}Ti_{(1+x)}O_5$, where $0.1 \leq x < 0.5$ and 0.1 to 1 mol % of Al atoms are substituted with Si atoms, wherein
some Al atoms in a surface layer of the aluminum magnesium titanate crystal are substituted with Si atoms;
the aluminum magnesium titanate crystal has a thermal expansion coefficient of from $-6 \times 10^{-6}$ (1/K) to $6 \times 10^{-6}$ (1/K) in a range of from 50 to 800° C. at a temperature raising rate of 20° C./min; and the aluminum magnesium titanate crystal has a remaining ratio, α, of aluminum magnesium titanate of at least 50%, after heating in an atmosphere of 1,100° C. for 300 hours, where $\alpha = 100(R/R_0)$, $R_0 = I_{MAT(023)}/(I_{MAT(023)} + I_{TiO2(110)})$ before the heating, $R = I_{MAT(023)}/(I_{MAT(023)} + I_{TiO2(110)})$ after the heating, $I_{MAT(023)}$ is an integrated intensity of a X-ray diffraction peak from the aluminum magnesium titanate corresponding to the (023) face of aluminum magnesium titanate, and $I_{TiO2(110)}$ is an integrated intensity of an X-ray diffraction peak from the aluminum magnesium titanate corresponding to the (110) face of rutile.

2. The aluminum magnesium titanate crystal structure according to claim 1, which has a three-point bending strength of at least 25 MPa.

3. A process for producing the aluminum magnesium titanate crystal structure as defined in claim 1, which comprises firing at a temperature of from 1,200 to 1,700° C., a raw material mixture having 1 to 10 parts by mass of a silicon-containing compound having a melting point of from 700 to 1,500° C., mixed to 100 parts by mass of a mixture comprising a Mg-containing compound, Al-containing compound and Ti-containing compound in the same ratio as the metal component ratio of Mg, Al and Ti in aluminum magnesium titanate represented by the empirical formula $Mg_xAl_{2(1-x)}Ti_{(1+x)}O_5$, wherein $0.1 \leq x < 0.5$, as calculated as the respective oxides.

4. The process according to claim 3, wherein aluminum magnesium titanate crystal is formed in a liquid phase of the silicon-containing compound.

5. The process according to claim 3, wherein molding assistants are added to the raw material mixture, followed by firing a molded product.

6. The process according to claim 3, wherein the raw material mixture is subjected to prefiring within a temperature range of from 700 to 1,000° C., followed by firing.

7. The process according to claim 3, wherein the silicon-containing compound is an aluminosilicate.

8. The process according to claim 7, wherein the aluminosilicate is at least one mineral selected from the group of minerals consisting of plagioclase, feldspathoid, mica clay mineral, zeolite and cordierite.

9. The process according to claim 4, wherein molding assistants are added to the raw material mixture, followed by firing a molded product.

10. The process according to claim 5, wherein the raw material mixture is subjected to prefiring within a temperature range of from 700 to 1,000° C., followed by firing.

11. The process according to claim 4, wherein the silicon-containing compound is an aluminosilicate.

12. The process according to claim 5, wherein the silicon-containing compound is an aluminosilicate.

13. The process according to claim 6, wherein the silicon-containing compound is an aluminosilicate.

14. The process according to claim 9, wherein the silicon-containing compound is an aluminosilicate.

15. The process according to claim 10, wherein the silicon-containing compound is an aluminosilicate.

16. The process according to claim 11, wherein the aluminosilicate is at least one mineral selected from the group of minerals consisting of plagioclase, feldspathoid, mica clay mineral, zeolite and cordierite.

17. The process according to claim 12, wherein the aluminosilicate is at least one mineral selected from the group of minerals consisting of plagioclase, feldspathoid, mica clay mineral, zeolite and cordierite.

18. The process according to claim 13, wherein the aluminosilicate is at least one mineral selected from the group of minerals consisting of plagioclase, feldspathoid, mica clay mineral, zeolite and cordierite.

19. The process according to claim 14, wherein the aluminosilicate is at least one mineral selected from the group of minerals consisting of plagioclase, feldspathoid, mica clay mineral, zeolite and cordierite.

20. The process according to claim 15, wherein the aluminosilicate is at least one mineral selected from the group of minerals consisting of plagioclase, feldspathoid, mica clay mineral, zeolite and cordierite.

21. A process for producing an aluminum magnesium titanate crystal structure comprising aluminum magnesium titanate represented by the empirical formula $Mg_xAl_{2(1-x)}Ti_{(1+x)}O_5$, where $0.1 \leq x < 0.5$ and 0.1 to 1 mol % of Al atoms are substituted with Si atoms, the process comprising
firing, at a temperature of from 1,200 to 1,700° C., a raw material mixture comprising
1 to 10 parts by mass of a silicon-containing compound having a melting point of from 700 to 1,500° C. selected from the group consisting of plagioclase, feldspathoid, mica clay mineral, zeolite and cordierite, and
100 parts by mass of a mixture comprising a Mg-containing compound, an Al-containing compound and a Ti-containing compound in the same ratio as the metal component ratio of Mg, Al and Ti in the aluminum magnesium titanate represented by the empirical formula $Mg_xAl_{2(1-x)}Ti_{(1+x)}O_5$, where $0.1 \leq x < 0.5$, as calculated as the respective oxides.

22. A solid solution of aluminum magnesium titanate crystal represented by the empirical formula $Mg_xAl_{2(1-x)}Ti_{(1+x)}O_5$, where $0.1 \leq x < 0.5$ and 0.1 to 1 mol % of Al atoms are substituted with Si atoms.

23. The solid solution of aluminum magnesium titanate crystal of claim 22,
which has a thermal expansion coefficient of from $-6 \times 10^{-6}$ (1/K) to $6 \times 10^{-6}$ (1/K) in a range of from 50 to 800° C. at a temperature raising rate of 20° C./min; and
which has a remaining ratio, α, of aluminum magnesium titanate of at least 50% after heating in an atmosphere of 1,100° C. for 300 hours, where α is $100 (R/R_0)$, where $R = I_{MAT(023)}/(I_{MAT(023)} + I_{TiO2(110)})$ after the heating, $R_0 = I_{MAT(023)}/(I_{MAT(023)} + I_{TiO2(110)})$ before the heating, wherein $I_{MAT(023)}$ is an integrated intensity of a X-ray diffraction peak from the aluminum magnesium titanate corresponding to the (023) face of aluminum magnesium titanate, and $I_{TiO2(110)}$ is an integrated intensity of a X-ray diffraction peak from the aluminum magnesium titanate corresponding to the (110) face of rutile.

24. A solid solution of aluminum magnesium titanate crystal represented by the empirical formula $Mg_xAl_{2(1-x)}Ti_{(1+x)}O_5$, where $0.1 \leq x < 0.5$,
wherein 0.1 to 1 mol % of Al atoms are substituted with Si atoms; and
wherein said solid solution contains from >0 to 15 parts by mass of $SiO_2$, $ZrO_2$, $Fe_2O_3$, MgO, $Al_2O_3$, $TiO_2$, CaO, $Y_2O_3$, and oxides having a spinel structure containing Mg per 100 parts by mass.

25. The aluminum magnesium titanate crystal structure of claim 1, wherein 0.25 mol % to 0.45 mol % of Al atoms are substituted by silicon atoms.

26. The process of claim 3, wherein 0.25 mol % to 0.45 mol % of Al atoms are substituted by silicon atoms.

* * * * *